United States Patent

[11] 3,615,225

| [72] | Inventors | Rigobert Otto<br>Leverkusen;<br>Hans-Heinrich Credner, Muenchen;<br>Arthur Henri De Cat, Mortsel; Walter<br>Puschel, Leverkusen, all of Germany |
|---|---|---|
| [21] | Appl. No. | 780,894 |
| [22] | Filed | Dec. 3, 1968 |
| [45] | Patented | Oct. 26, 1971 |
| [73] | Assignee | AGFA-Gevaert Aktiengesellschaft<br>Leverkusen, Germany |
| [32] | Priority | Dec. 12, 1967 |
| [33] | | Germany |
| [31] | | P 15 97 510.7 |

[54] COLOR PHOTOGRAPHIC MATERIAL
3 Claims, No Drawings

| [52] | U.S. Cl. | 96/100 |
|---|---|---|
| [51] | Int. Cl. | G03c 1/40 |
| [50] | Field of Search | 96/100 |

[56] References Cited

UNITED STATES PATENTS

| 3,034,892 | 5/1962 | Gledhill et al. | 96/100 X |
|---|---|---|---|
| 3,148,062 | 9/1964 | Whitmore et al. | 96/100 X |
| 3,386,830 | 6/1968 | Yoshida et al. | 96/100 |
| 3,459,552 | 8/1969 | Yoshida et al. | 96/100 |
| 3,481,741 | 12/1969 | Yoshida et al. | 96/100 |

FOREIGN PATENTS

| 840,731 | 7/1960 | Great Britain | 96/100 |
|---|---|---|---|
| 939,242 | 10/1963 | Great Britain | 96/100 |
| 1,088,532 | 10/1967 | Great Britain | 96/100 |
| 1,091,984 | 11/1967 | Great Britain | 96/100 |

*Primary Examiner*—William D. Martin
*Assistant Examiner*—M. R. Lusignan
*Attorney*—Connolly and Hutz ABSTRACT: Light-sensitive photographic material containing at least one silver halide emulsion layer which contains an effective amount of a colored cyan-forming coupler that has an absorption maximum of between 460 $\mu$ to about 510 $\mu$.

COLOR PHOTOGRAPHIC MATERIAL

This invention relates to a color photographic material which shows improved color reproduction, and which contains couplers for the production of so-called built-in masks.

It is already known that the side color densities of the image dyes which are formed in the course of chromogenic development of photographic multilayer materials by means of masking processes may be eliminated. In color photographic materials, this can be achieved by using so-called built-in masks. These masks are produced in the course of photographic processing using color couplers which have the necessary color for masking the unwanted side color densities of the image dyes. Color couplers which are suitable for this purpose generally have the basic chemical structure of the usual color couplers, but, at the coupling position for the reaction with the oxidized color developer, there is usually a group, generally an azo dye group, which imparts the color to the color coupler and which is split off in the reaction with the oxidized color developer. The image dye is thereby formed at the exposed and developed areas by color development and the color of the colored color coupler is preserved in the unexposed areas.

In order that the colored couplers may be used for color photography, these colored couplers must have certain properties. The integrated side absorptions of the image dyes in the blue and green region of the spectrum must be compensated by the integrated absorption of the masking dyes. Most azo dyes do not fulfill this requirement. If a color coupler forms azo methine dyes which absorb at especially long wavelengths, then although the corresponding azo dyes also absorb at long wave lengths being colored red to purple, the masking effect is not sufficient because the side absorption of the image dye is much stronger in the blue region than in the green. If, on the other hand, a component leads to the formation of azomethine dyes absorbing light of shorter wavelengths, the side absorption of the image dye lies more in the green than in the blue region but the corresponding azo dyes being colored yellow to orange absorb at shorter wavelengths of the spectrum, so that the masking effect is again not sufficient. Since the magenta dye-forming layer of the multilayer material contains a yellow azo dye, the presence of an additional yellow dye in the cyan dye-forming layer would result in a too high a yellow density of the film material. A suitable masking dye for the cyan image should therefore be colored red to purple and should be produced from a component which yields azomethine dye on chromogenic development which does not absorb light of too long a wavelength.

The coupling speed of the colored component, i.e., the speed of formation of the azomethine dye with removal of the azo residue, should be just as great as the coupling speed of the uncolored component to the azomethine dye. The absorption and the coupling speeds of the masking dye can be measured sensitometrically by the masking effect. If the color density of an exposed and color developed stepwedge is plotted against the quantity of silver formed the sensitometric curves measured behind the blue and green filters should already start to fall with the smallest possible quantity of developed silver while the red filter curve at the same time rises, thus indicating the formation of the cyan dye.

It is an object of the invention to provide colored color couplers for the production of built-in red masks which satisfy the practical requirements as regards their photographic and absorption properties.

It has now been found that colored couplers of the following formula are particularly suitable for use in the production of built-in masks, in providing the required absorption properties and behavior during coupling:

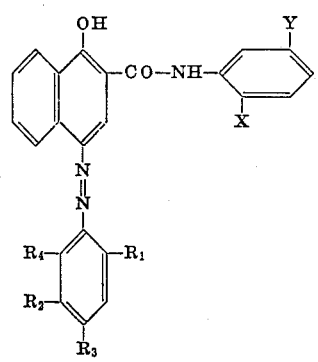

in which $R_1$ represents a carboxyl or sulfo group;

$R_2$ represents a hydrogen atom or an acylamino group in which the acyl groups are advantageously derived from short chained aliphatic carboxylic acids which contain up to six carbon atoms or phenyl carboxylic acids, especially benzoic acid;

$R_3$ represents a hydrogen atom or a halogen atom such as chlorine or bromine; if $R_2$ is an acylamino group, $R_3$ is a hydrogen atom;

$R_4$ represents a hydrogen atom or a halogen atom such as chlorine or bromine, if $R_2$ is a hydrogen atom then $R_4$ represents a halogen atom;

X represents an amino group, preferably a dialkylamino group, the alkyl radicals of which contain up to 20 carbon atoms; in the case where X is a dialkyl amino group, one of the alkyl groups advantageously contains 12 to 20 carbon atoms and the other alkyl groups preferably contains up to five carbon atoms; X may also represent alkoxy with up to 20 carbon atoms or a phenylthio group;

Y represents hydrogen atom, or a carboxyl, sulfo or a mono- or dialkyl sulfamyl group in which the alkyl group advantageously has the number of carbon atoms indicated for alkyl substituents in the group X.

The following compounds, for example, have been found to be suitable:

(1)

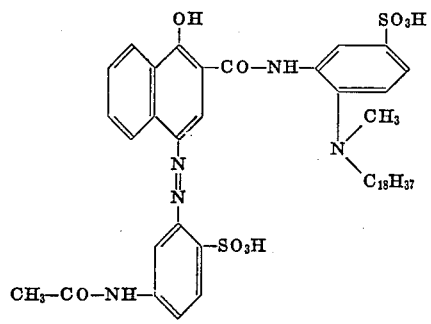

(2)

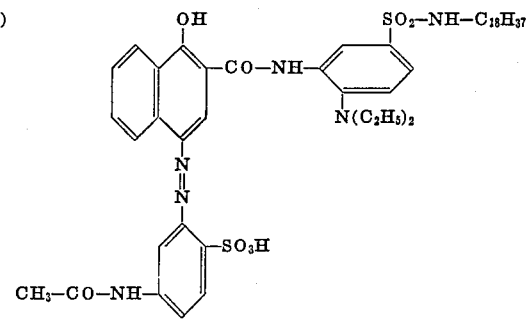

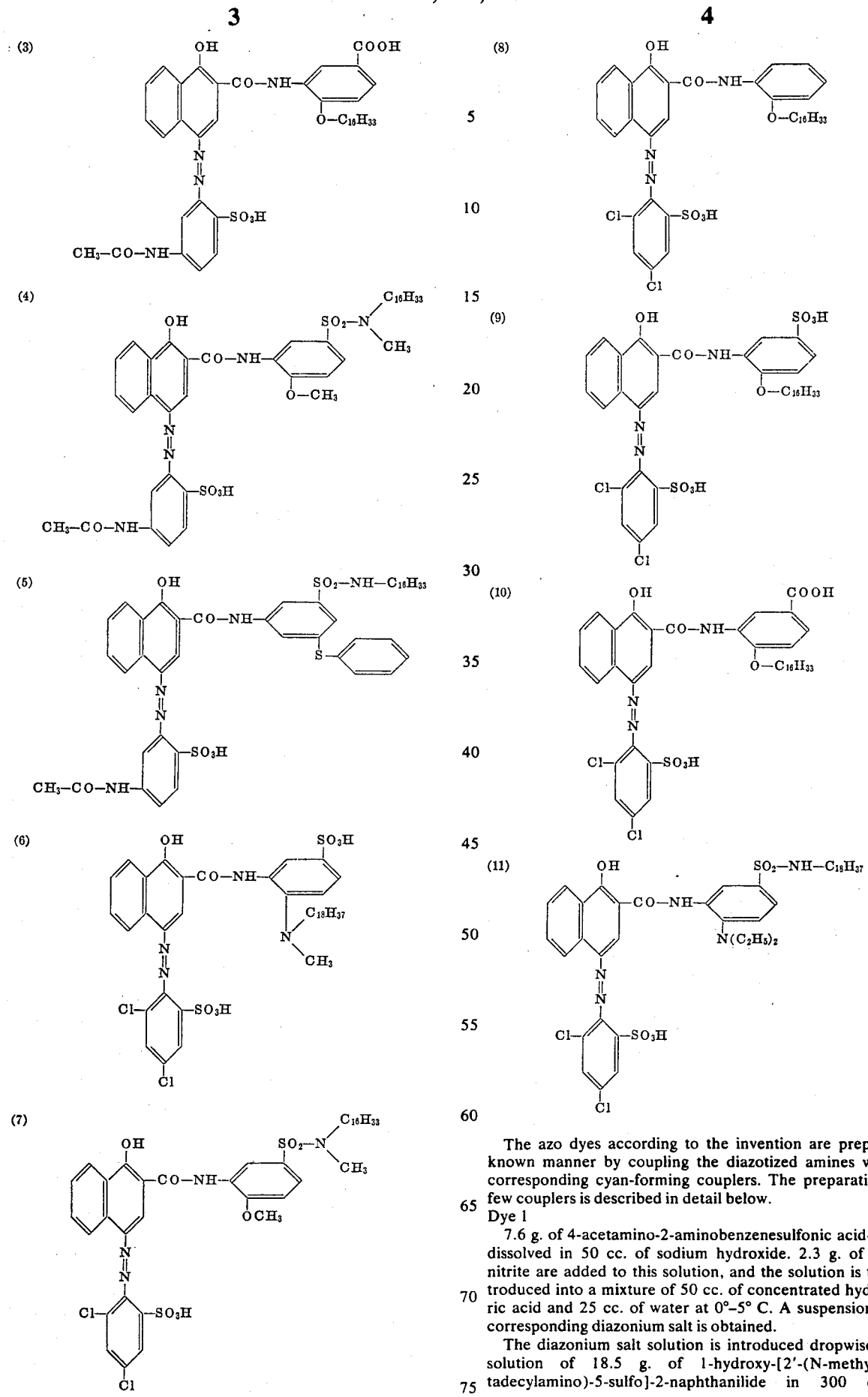

The azo dyes according to the invention are prepared in known manner by coupling the diazotized amines with the corresponding cyan-forming couplers. The preparation of a few couplers is described in detail below.

Dye 1

7.6 g. of 4-acetamino-2-aminobenzenesulfonic acid-(1) are dissolved in 50 cc. of sodium hydroxide. 2.3 g. of sodium nitrite are added to this solution, and the solution is then introduced into a mixture of 50 cc. of concentrated hydrochloric acid and 25 cc. of water at 0°–5° C. A suspension of the corresponding diazonium salt is obtained.

The diazonium salt solution is introduced dropwise into a solution of 18.5 g. of 1-hydroxy-[2'-(N-methyl-N-octadecylamino)-5-sulfo]-2-naphthanilide in 300 cc. of methanol containing sufficient sodium hydroxide solution to maintain a pH of 8 to 9. The reaction mixture is then stirred for 2 hours and the precipitated dye is filtered by suction, washed with methanol and is then dried in a vacuum. The resulting red dye has an absorption maximum at 462 m$\mu$ in gelatin.

Dye 6

8.0 g. of 3,5-dichloro-2-aminobenzenesulfonic acid are dissolved in 150 cc. of water containing 4 g. of sodium hydroxide. Regardless of the amount of sodium salt precipitated, 2.3 g. of sodium nitrite are added and the resulting suspension is added to a mixture of 50 cc. of concentrated hydrochloric acid and 25 cc. of water at 0° to 5° C. The suspension of the diazonium salt obtained is introduced into a solution of 18.5 g. of 1-hydroxy-[2'-(N-methyl-N-octadecylamino)-5-sulfo]-2-naphthanilide at 0° to 10° C., while the pH is kept constant at 8 to 9 by the addition of 2N sodium hydroxide solution. The reaction mixture is then stirred for 2 hours and the precipitated dye is filtered by suction, washed with methanol and dried in vacuum. The red dye has an absorption maximum of about 475 m$\mu$ in gelatin.

The azo dye couplers to be used in accordance with the invention are dissolved in alkali and added in the form of such a solution to the photographic silver halide emulsions by known methods.

The new couplers are superior to the known couplers in many of their properties. They are red to purple in color and have an absorption maximum of 460 to 510 m$\mu$. This absorption range corresponds to the requirement mentioned above of compensating the side absorption of the cyan image dyes which lies more in the green than in the blue region of the spectrum.

The couplers according to the invention may be used alone, or preferably, together with colorless cyan-forming couplers in the red-sensitive layer.

EXAMPLE 1

One g. of the colored color coupler 1 is dissolved in an alkaline medium and the solution is added to a light-sensitive gelatin silver iodobromide emulsion. The mixture is poured onto a support layer of cellulose acetate in the usual manner.

A strip of film on which a step wedge has been exposed to direct light is developed using a color developer which contains diethyl-p-phenylenediaminosulfate as developing agent. A cyan dye is produced in the exposed areas whilst the original dye is retained in the unexposed areas. The particularly advantageous absorption properties of the masking dye are evident from the sensitometric data. The color density measured behind green and blue filters is approximately unchanged. These curves are practically parallel.

EXAMPLE 2

One g. of dye 10 is dissolved in alkali and a solution of a light-sensitive gelatino silver iodobromide emulsion is added. In addition, 2 g. of the cyan-forming coupler 1-hydroxy-[2'-(N-methyl-N-octadecylamino)-5'-sulfo]-2-naphthanilide are added. The mixture is poured onto a support layer of cellulose triacetate in the usual manner. The samples are exposed as described in example 1 and the processed.

A cyan dye is formed in the exposed areas whereas the original masking dye remains in the unexposed areas. The sensitometric measurements show that the material is excellently masked in the blue and green regions in which measurement is made.

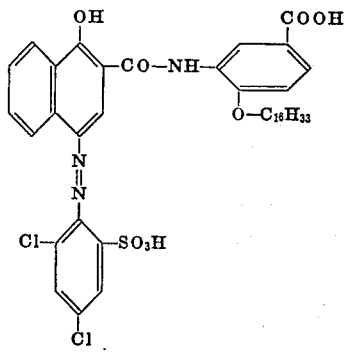

We claim:

1. In light-sensitive photographic material containing at least one silver halide emulsion layer which contains an effective amount of a colored cyan-forming coupler that has an absorption maximum of between about 460 $\mu$ to about 510 $\mu$ and has the following formula:

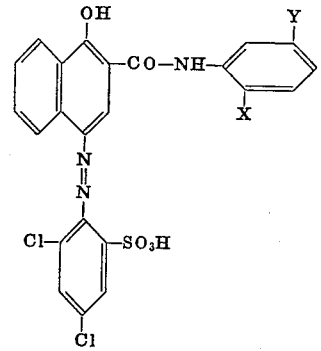

in which

X represents an alkoxy group with up to 20 carbon atoms, or an amino group;

Y represents a hydrogen atom, or a carboxyl, sulfo or a mono- or dialkylsulfamyl group.

2. Light-sensitive photographic material according to claim 1, the silver halide emulsion layer of which contains a cyan-forming coupler of the following formula:

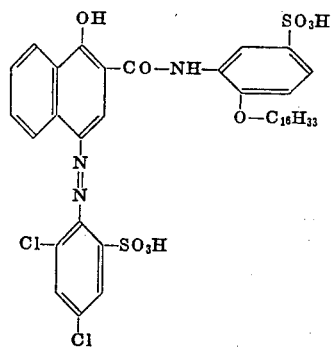

3. Light-sensitive photographic material according to claim 1, the silver halide emulsion layer of which contains a cyan-forming coupler of the following formula: